(12) United States Patent
Arunmozhi et al.

(10) Patent No.: US 11,794,701 B2
(45) Date of Patent: Oct. 24, 2023

(54) VEHICLE SENSOR CLEANING

(71) Applicant: Ford Global Technologies, LLC, Dearborn, MI (US)

(72) Inventors: Ashwin Arunmozhi, Canton, MI (US); Michael Robertson, Jr., Garden City, MI (US); Venkatesh Krishnan, Canton, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 16/921,990

(22) Filed: Jul. 7, 2020

(65) Prior Publication Data
US 2022/0009452 A1    Jan. 13, 2022

(51) Int. Cl.
*B60S 1/52*  (2006.01)
*B05B 9/04*  (2006.01)
*B60S 1/48*  (2006.01)
*B60S 1/50*  (2006.01)

(52) U.S. Cl.
CPC ............. *B60S 1/52* (2013.01); *B05B 9/0403* (2013.01); *B60S 1/481* (2013.01); *B60S 1/50* (2013.01)

(58) Field of Classification Search
None
See application file for complete search history.

(56) References Cited

U.S. PATENT DOCUMENTS

| | | | |
|---|---|---|---|
| 7,552,717 B2 | 6/2009 | Dingle | |
| 10,220,817 B2 | 3/2019 | Rice | |
| 10,569,747 B2 | 2/2020 | Trebouet et al. | |
| 2015/0226630 A1* | 8/2015 | Nakagawa | G01M 3/223 73/40.7 |
| 2017/0009668 A1* | 1/2017 | Nishida | B60T 13/46 |
| 2019/0100168 A1* | 4/2019 | Krishnan | B60S 1/56 |
| 2019/0176075 A1* | 6/2019 | Hoff | F02M 35/024 |
| 2019/0299939 A1 | 10/2019 | Davies et al. | |
| 2019/0322245 A1* | 10/2019 | Kline | B60S 1/0848 |

* cited by examiner

*Primary Examiner* — Natasha N Campbell
*Assistant Examiner* — Pradhuman Parihar
(74) *Attorney, Agent, or Firm* — Frank A. MacKenzie; Bejin Bieneman PLC

(57) ABSTRACT

A solenoid valve in a manifold is commanded to move to a closed position. Upon activating a pump to supply fluid to the manifold via a supply line, a first pressure is determined in the supply line after commanding the solenoid valve to move to the closed position. Upon deactivating the pump to stop supplying fluid to the manifold, a second pressure is determined in the supply line. Based on a difference between the first pressure and the second pressure, the solenoid valve is determined to be one of (a) at least partially open or (b) in the closed position.

20 Claims, 4 Drawing Sheets

VEHICLE SENSOR CLEANING

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by obstructions, e.g., dust, snow, insects, etc., as well as by degradation of features of the sensor window or lens caused by the environment.

DETAILED DESCRIPTION

Figure 1:
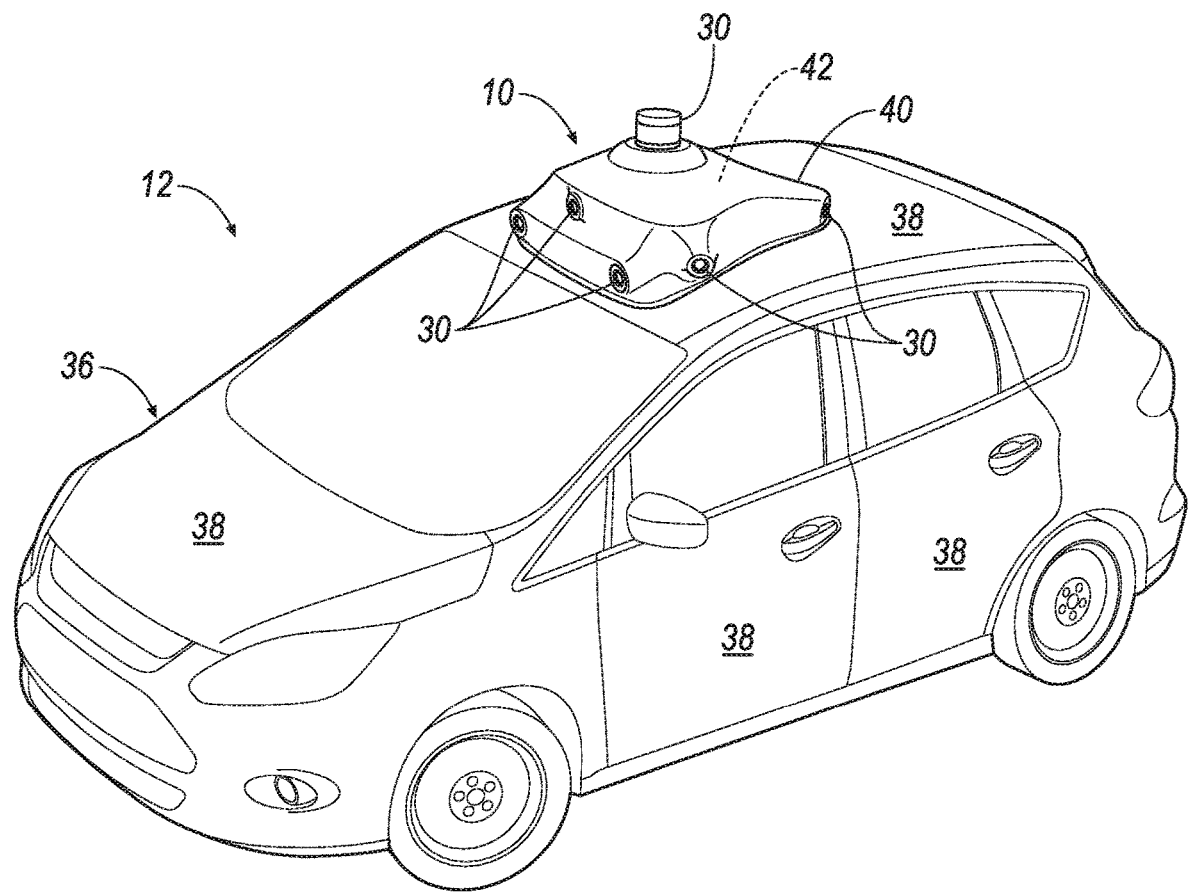
FIG. 1 is a perspective view of an example vehicle including a sensor system.

A system includes a computer including a processor and a memory, the memory storing instructions executable by the processor to command a solenoid valve in a manifold to move to a closed position. The instructions further include instructions to, upon activating a pump to supply fluid to the manifold via a supply line, determine a first pressure in the supply line after commanding the solenoid valve to move to the closed position. The instructions further include instructions to, upon deactivating the pump to stop supplying fluid to the manifold, determine a second pressure in the supply line. The instructions further include instructions to, based on a difference between the first pressure and the second pressure, determine the solenoid valve is one of (a) at least partially open or (b) in the closed position.

The instructions can further include instructions to determine the solenoid valve is in the closed position based on the difference between the first pressure and the second pressure being less than or equal to a first threshold.

The instructions can further include instructions to determine the solenoid valve is partially open based on the difference between the first pressure and the second pressure being between a first threshold and a second threshold. The second threshold may be greater than the first threshold.

The instructions can further include instructions to determine the solenoid valve is completely open based on the difference between the first pressure and the second pressure being greater than the second threshold.

The instructions can further include instructions to, upon determining the difference between the first pressure and the second pressure is greater than a first threshold, identify a fluid on a sensor as one of washer fluid or environmental fluid based on data from the sensor.

The instructions can further include instructions to determine the solenoid is one of (a) at least partially open based additionally on identifying the fluid as washer fluid on the sensor, or (b) in the closed position based additionally on identifying the fluid as environmental fluid on the sensor.

The instructions can further include instructions to, upon determining the solenoid valve is in the closed position, determine a fluid leak is between the pump and the manifold.

The instructions can further include instructions to, upon determining obstruction trigger for a sensor, actuate the solenoid valve to provide fluid to a nozzle aimed at the sensor.

The supply line can include a one-way check valve between the pump and the manifold.

A method includes commanding a solenoid valve in a manifold to move to a closed position. The method further includes, upon activating a pump to supply fluid to the manifold via a supply line, determining a first pressure in the supply line after commanding the solenoid valve to move to the closed position. The method further includes, upon deactivating the pump to stop supplying fluid to the manifold, determining a second pressure in the supply line. The method further includes, based on a difference between the first pressure and the second pressure, determining the solenoid valve is one of (a) at least partially open or (b) in the closed position.

The method can further include determining the solenoid valve is in the closed position based on the difference between the first pressure and the second pressure being less than or equal to a first threshold.

The method can further include determining the solenoid valve is partially open based on the difference between the first pressure and the second pressure being between a first threshold and a second threshold. The second threshold may be greater than the first threshold.

The method can further include determining the solenoid valve is completely open based on the difference between the first pressure and the second pressure being greater than the second threshold.

The method can further include, upon determining the difference between the first pressure and the second pressure is greater than a first threshold, identifying a fluid on a sensor as one of washer fluid or environmental fluid based on data from the sensor.

The method can further include, determining the solenoid is one of (a) at least partially open based additionally on identifying the fluid as washer fluid on the sensor, or (b) in the closed position based additionally on identifying the fluid as environmental fluid on the sensor.

The method can further include, upon determining the solenoid valve is in the closed position, determining a fluid leak is between the pump and the manifold.

The method can further include, upon determining an obstruction trigger for a sensor, actuate the solenoid valve to provide fluid to a nozzle aimed at the sensor.

A cleaning system includes a pump. The cleaning system includes a sensor and a nozzle aimed at the sensor. The cleaning system includes a manifold including an inlet, an outlet, and a solenoid valve between the outlet and the nozzle. The cleaning system includes a supply line between the pump to the inlet of the manifold. The supply line includes a one-way check valve between the pump and the inlet of the manifold. The one-way check valve is positioned to prevent fluid flow from the manifold to the pump. The cleaning system includes a pressure sensor fluidly connected to the supply line between the manifold and the one-way check valve.

The cleaning system can include a computer communicatively coupled to each solenoid valve and the pump, the computer is programmed to command a solenoid valve in a manifold to move to a closed position. The instructions can further include instructions to, upon activating a pump to supply fluid to the manifold via a supply line, determine a first pressure in the supply line after commanding the solenoid valve to move to the closed position. The instructions can further include instructions to, upon deactivating the pump to stop supplying fluid to the manifold, determine a second pressure in the supply line. The instructions can further include instructions to, based on a difference between the first pressure and the second pressure, determine the solenoid valve is one of (a) at least partially open or (b) in the closed position.

The instructions can further include instructions to, upon determining the difference between the first pressure and the second pressure is greater than a first threshold, identify a fluid on a sensor as one of washer fluid or environmental fluid based on data from the sensor. The instructions can further include instructions to determine the solenoid is one of (a) at least partially open based additionally on identifying the fluid as washer fluid on the sensor, or (b) in the closed position based additionally on identifying the fluid as environmental fluid on the sensor.

Further disclosed herein is a computing device programmed to execute any of the above method steps. Yet further disclosed herein is a computer program product, including a computer readable medium storing instructions executable by a computer processor, to execute an of the above method steps.

With reference to the Figures, wherein like numerals indicate like parts throughout the several views, a sensor system 10 for a vehicle 12 is shown. The sensor system 10 includes a computer 14 programmed to command a solenoid valve 16 in a manifold 18 to move to a closed position. The computer 14 is programmed to, upon activating a pump 20 to supply fluid to the manifold 18 via a primary supply line 22, determine a first pressure in the primary supply line 22 after commanding the solenoid valve 16 to move to the closed position. The computer 14 is programmed to, upon deactivating the pump 20 to stop supplying fluid to the manifold 18, determine a second pressure in the primary supply line 22. The computer 14 is programmed to, based on a difference between the first pressure and the second pressure, determine the solenoid valve 16 is one of (a) at least partially open or (b) in the closed position.

The sensor system 10 includes a cleaning system 28 that can clean a plurality of sensors 30, which can improve the quality of data gathered by the sensors 30. For example, the manifold 18 can direct fluid to individual sensors 30 that need cleaning, such that the cleaning system 28 provides fluid through a nozzle 32 aimed at the sensor 30. Thus, the sensors 30 for which the nozzles 32 supply fluid can receive a predictable supply of fluid. However, components of the cleaning system 28 may leak, e.g., due to wear, an improper connection, the solenoid valve 16 being partially open, etc., such that the cleaning system 28 may be unable to provide a predictable supply of fluid to a sensor 30 that requires cleaning. Advantageously, based on data received from a pressure sensor 34 positioned between the pump 20 and the manifold 18, the computer 14 can determine whether the cleaning system 28 has a fluid leak. Upon determining the cleaning system 28 has a fluid leak, the computer 14 can then determine the fluid leak is either in the manifold 18, i.e., the solenoid valve 16 is at least partially open, or between the pump 20 and the manifold 18, e.g., in the primary supply line 22, which can assist in expediting repair and/or maintenance.

With reference to FIG. 1, the vehicle 12 may be any passenger or commercial automobile such as a car, a truck, a sport utility vehicle, a crossover, a van, a minivan, a taxi, a bus, etc.

The vehicle 12 may be an autonomous vehicle. A vehicle computer can be programmed to operate the vehicle 12 independently of the intervention of a human driver, completely or to a lesser degree. The vehicle 12 computer may be programmed to operate the propulsion, brake system, steering, and/or other vehicle systems based at least in part on data received from sensors 30. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 12 includes a body 36. The vehicle 12 may be of a unibody construction, in which a frame and the body 36 of the vehicle 12 are a single component. The vehicle 12 may, alternatively, be of a body-on-frame construction, in which the frame supports the body 36 that is a separate component from the frame. The frame and body 36 may be formed of any suitable material, for example, steel, aluminum, etc.

The body 36 includes body panels 38 partially defining an exterior of the vehicle 12. The body panels 38 may present a class-A surface, e.g., a finished surface exposed to view by a customer and free of unaesthetic blemishes and defects. The body panels 38 include, e.g., a roof, a hood, a door outer, etc.

The sensor system 10 includes a housing 40 for the sensors 30. The housing 40 is attachable to the vehicle 12, e.g., to one of the body panels 38 of the vehicle 12, e.g., the roof. For example, the housing 40 may be shaped to be attachable to the roof, e.g., may have a shape matching a contour of the roof. The housing 40 may be attached to the roof, which can provide the sensors 30 with an unobstructed field of view of an area around the vehicle 12. The housing 40 may be, e.g., plastic or metal. The sensor system 10 may include any suitable number of housings 40. For example, the sensor system 10 may include one housing 40, as shown in FIG. 1. In such an example, the housing 40 may be referred to as a "front tiara". As another example, the sensor system 10 may include two housings 40 spaced from each other along a longitudinal axis of the vehicle 12. In such an example, one housing 40 may be the front tiara, and the other housing 40 may be referred as a "rear tiara".

The housing 40 may enclose and define a cavity 42. One or more of the body panels 38, e.g., the roof, may partially define the cavity 42, or the housing 40 may fully enclose the cavity 42. The housing 40 may shield contents of the cavity 42 from external elements such as wind, rain, debris, etc.

The sensors 30 may detect the location and/or orientation of the vehicle 12. For example, the sensors 30 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 30 may detect the external world, e.g., objects and/or characteristics of surroundings of the vehicle 12, such as other vehicles, road lane markings, traffic lights and/or signs, pedestrians, etc. For example, the sensors 30 may include radar sensors, scanning laser range finders, light detection and ranging (LIDAR) devices, and image processing sensors such as cameras. The sensors 30 may include communications devices, for example, vehicle-to-infrastructure (V2I) or vehicle-to-vehicle (V2V) devices.

The sensors 30 may be disposed in the cavity 42 of the housing 40 or may be mounted to the housing 40. For example, the sensors 30 can include multiple cameras disposed in the cavity 42 and at least one LIDAR device mounted to the housing 40, as shown in FIG. 1. Alternatively, the sensors 30 may be mounted to the body 36 of the vehicle 12.

Figure 2:
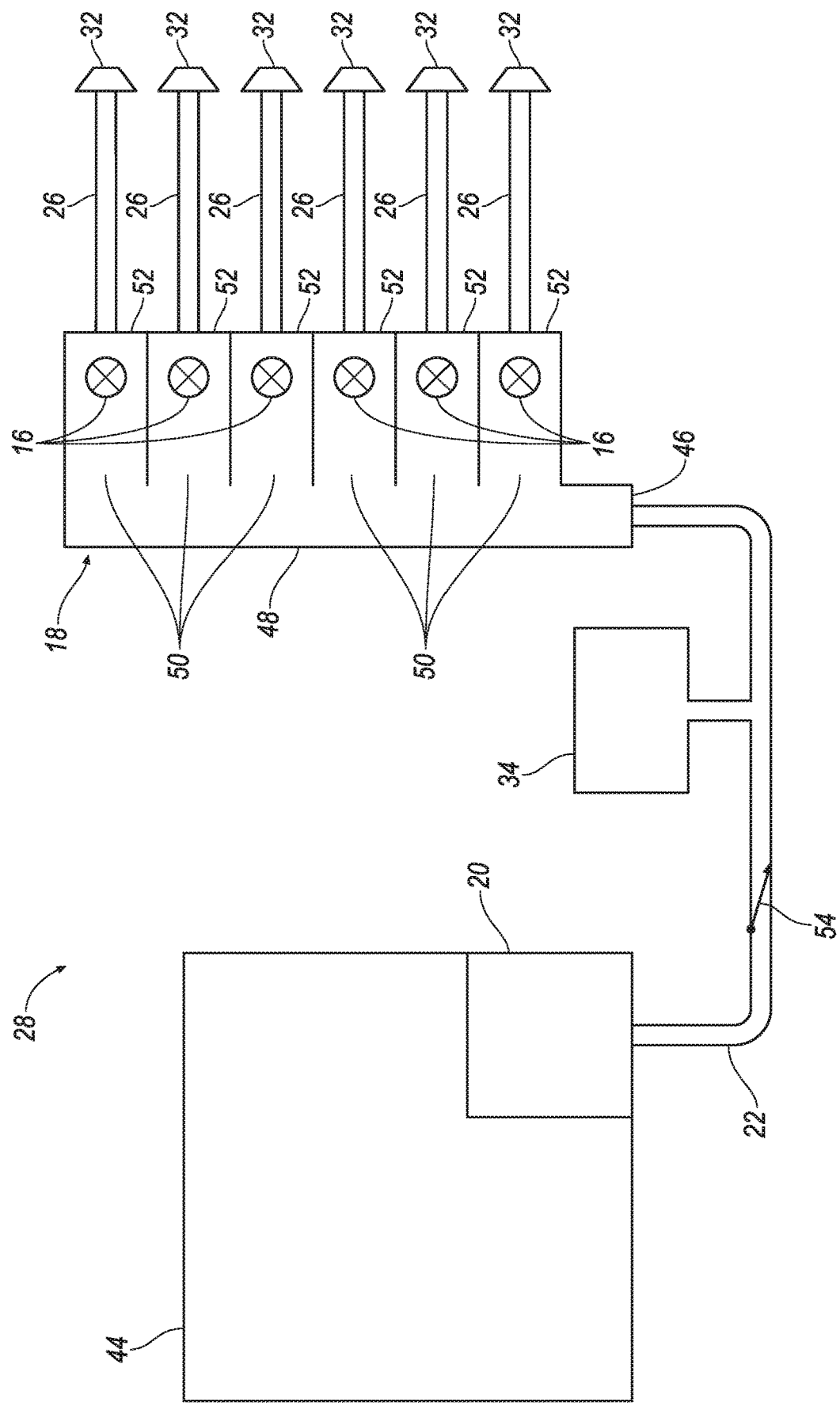
FIG. 2 is a diagram of a cleaning system for the sensor system.

With reference to FIG. 2, the cleaning system 28 of the sensor system 10 includes a reservoir 44, the pump 20, supply lines 22, 26, the pressure sensor 34, the manifold 18, and nozzles 32. Fluid can flow from the reservoir 44 and the pump 20 to the nozzles 32 via the supply lines 22, 26 and the manifold 18. The cleaning system 28 distributes washer fluid stored in the reservoir 44 to the nozzles 32. "Washer fluid" is any liquid stored in the reservoir 44 for cleaning. The washer fluid may include solvents, detergents, diluents such as water, etc.

The reservoir 44 is a tank fillable with liquid, e.g., washer fluid for window cleaning. The reservoir 44 may be disposed in a front of the vehicle 12, specifically, in an engine compartment forward of a passenger cabin. The reservoir 44 may store the washer fluid only for supplying the sensors 30 or also for other purposes, such as supply to a windshield. Alternatively, the reservoir 44 may be disposed in the cavity 42 of the housing 40.

The pump 20 can force the washer fluid through the supply lines 22, 26 and the manifold 18 to the nozzles 32 with sufficient pressure that the washer fluid sprays from the nozzles 32. The pump 20 is fluidly connected to the reservoir 44. The pump 20 may be attached to or disposed in the reservoir 44. The pump 20 is fluidly connected to the manifold 18, specifically to an inlet 46 of the manifold 18, via the primary supply line 22. The pump 20 may be designed to pressurize the washer fluid at the nozzle at a single pressure, pulsing pressure, pressure that increases over time or based on cleaning need, etc.

The manifold 18 includes the inlet 46, a pipe 48, a plurality of tubes 50, and outlets 52. The inlet 46 receives washer fluid from the pump 20 via the primary supply line 22, from which the washer fluid passes through the pipe 48 to the tubes 50, and from each tube 50 exits the manifold 18 through one of the outlets 52. The manifold 18 includes a plurality of solenoid valves 16, and one solenoid valve 16 is located in each tube 50, i.e., between the inlet 46 and one respective outlet 52. Each solenoid valve 16 controls flow through one tube 50, i.e., controls whether or not fluid is directed to respective nozzles 32. The manifold 18 can direct washer fluid entering the inlet 46 to any combination of tubes 50, i.e., can independently block or open each of the tubes 50 by independently opening or closing each of the solenoid valves 16. The manifold 18 can be disposed in the cavity 42 of the housing 40 and fixed relative to the cavity 42.

The solenoid valves 16 are actuatable between an open position and a closed position. Each solenoid valve 16 includes a solenoid and a plunger. Electrical current through the solenoid generates a magnetic field, and the plunger moves in response to changes in the magnetic field. Depending on its position, the plunger permits or blocks flow through the respective tube 50. Specifically, the solenoid valve 16 permits flow through the respective tube 50 in the open position, and the solenoid valve 16 prevents flow through the respective tube 50 in the closed position. When the solenoid valve 16 is between the open and closed positions, i.e., partially open, the solenoid valve 16 restricts flow through the respective tube 50. That is, when the solenoid valve 16 is partially open, the solenoid valve 16 permits less flow through the respective tube 50 than when the solenoid valve 16 is in the open position.

The supply lines 22, 26 extend from the pump 20 to the manifold 18 (i.e., to the inlet 46 of the manifold 18) and from the manifold 18 (i.e., outlets 52 of the manifold 18) to the nozzles 32. Specifically, the primary supply 22 line extends from the pump 20 to the manifold 18; and nozzle supply lines 26 each extend from the manifold 18, i.e., one respective outlet 52, to one of the nozzles 32. The supply lines 22, 26 may be, e.g., flexible tubes.

The primary supply line 22 includes a one-way check valve 54 positioned between the pump 20 and the pressure sensor 34. The one-way check valve 54 allows washer fluid to move through the primary supply line 22 from the pump 20 to the manifold 18. The one-way check valve 54 prevents washer fluid flow through the primary supply line 22 from the manifold 18 to the pump 20, i.e., prevents backflow. By preventing washer fluid flow from the manifold 18 to the pump 20, the one way check valve 54 can maintain the pressure in the primary supply line 22, which allows the computer 14 to determine whether the cleaning system 28 has a fluid leak, as discussed in further detail below. Additionally, the one way check valve 54 can improve response time for supplying washer fluid through the nozzles 32 by keeping washer fluid in the primary supply line 22.

Each of the nozzles 32 is fluidly connected to one of the tubes 50 via one of the nozzle supply lines 26. The solenoid valves 16 are independently operable to output washer fluid received in the manifold 18 from the primary supply line 22 to the respective nozzle supply lines 26 and thus to the respective nozzles 32. The nozzles 32 are positioned to eject the washer fluid to clear obstructions from the fields of view of the sensors 30, i.e., the nozzles 32 are aimed at the sensors 30. The pressure of the washer fluid exiting the nozzles 32 can dislodge or wash away obstructions that may impede the fields of view of the sensors 30.

The pressure sensor 34 detects pressure in the primary supply line 22 between the pump 20 and the manifold 18. That is, the pressure sensor 34 is a conventional sensor configured to detect fluid pressure in a supply line, tube, or the like. The pressure sensor 34 is positioned between the pump 20 and the manifold 18. Specifically, the pressure sensor 34 is fluidly connected to the pump 20 and the manifold 18 via the primary supply line 22. The pressure sensor 34 provides data to the computer 14, e.g., via a communications network 56 (as discussed further below).

Figure 3:
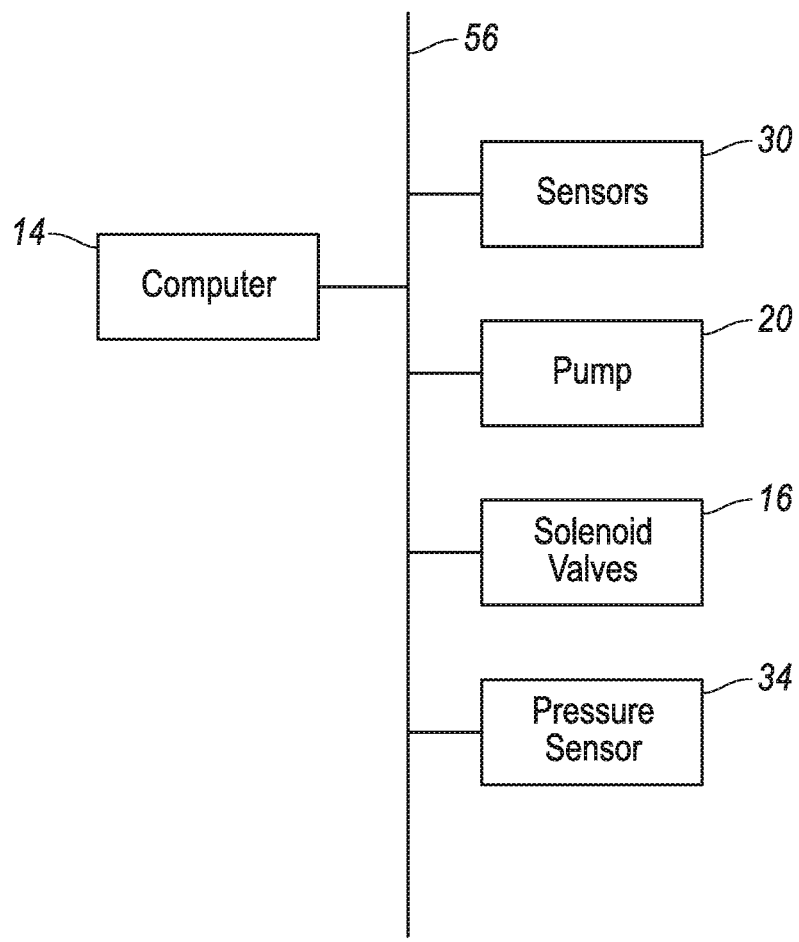
FIG. 3 is a block diagram of a control system for the cleaning system.

With reference to FIG. 3, the computer 14 is a microprocessor-based controller. The computer 14 includes a processor and a memory such as are known. The memory includes one or more forms of computer-readable media, and stores instructions executable by the processor for performing various operations, including as disclosed herein. The computer 14 may include a computing device, as described below. As an example, the computer 14 can include two or more computing devices operating in concert to carry out vehicle operations including as described herein. As another example, the computer 14 can be a generic computer with a processor and memory as described above and/or may include a dedicated electronic circuit including an ASIC that is manufactured for a particular operation, e.g., an ASIC for processing sensor 30, 34 data and/or communicating the sensor 30, 34 data. In another example, computer 14 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 14.

The computer 14 may transmit and receive data through the communications network 56 such as a controller area network (CAN) bus, Ethernet, WiFi, Local Interconnect Network (LIN), onboard diagnostics connector (OBD-II), and/or by any other wired or wireless communications network. The computer 14 may be communicatively coupled to the sensors 30, the pump 20, the solenoid valves 16, the pressure sensor 34, and other components via the communications network 56.

The computer 14 is programmed to receive data from the sensors 30 substantially continuously, periodically, etc. The computer 14 receives, e.g., image data from each of the sensors 30 through the communications network 56. Image data herein means digital image data, e.g., comprising pixels with intensity and color values, that can be acquired by sensors 30. The data are sequence of image frames of the field of view of each of the sensors 30. Each image frame is a two-dimensional matrix of pixels. Each pixel has a brightness or color represented as one or more numerical values, depending on the types of sensors 30. For example, if one of the sensors 30 is a monochrome camera, each pixel can be a scalar unitless value of photometric light intensity between 0 (black) and 1 (white). For another example, if one of the sensors 30 is a full-color camera, the pixels can be values for each of red, green, and blue, e.g., each on an 8-bit scale (0 to 255) or a 12- or 16-bit scale. Position in an image frame, i.e., position in the field of view of the respective sensors 30 at the time that the image frame was recorded, can be specified in pixel dimensions or coordinates, e.g., an ordered pair of pixel distances, such as a number of pixels from a top edge and a number of pixels from a left edge of the field of view. Alternatively, the data from the sensors 30 can be event-based vision, in which each pixel records independently of the other pixels when that pixel senses motion, thus recording more extensively about portions of the field of view experiencing change and recording less about portions of the field of view remaining static.

The computer 14 is programmed to determine whether an obstruction trigger has occurred. An "obstruction trigger" is any data received in the computer 14 that indicates that one of the sensors 30 should be cleaned. For example, the computer 14 may receive a user command to perform cleaning of one or more of the sensors 30 or of another component of the vehicle 12 such as a windshield. For another example, the computer 14 may determine that debris is on one of the sensors 30 based on data received from the respective sensor 30. For example, the computer 14 may determine, e.g., according to known image-analysis techniques, that a set of pixels in image data received from the respective sensor 30 is unchanging over time compared to the other of the pixels in the image data, suggesting that a portion of the field of view of that sensor 30 has been covered. Other algorithms may be used, e.g., classical computer vision or machine learning algorithms such as convolutional neural networks.

Upon determining the obstruction trigger has occurred, the computer 14 is programmed to actuate the cleaning system 28 to spray the respective sensor 30 with washer fluid. The computer 14 is programmed to command the pump 20 to activate and supply washer fluid to the supply lines 22, 26. The computer 14 is programmed to command the solenoid valve 16 corresponding to the respective sensor 30 to move to the open position while the rest of the solenoid valves 16 remain in the closed position, thus routing washer fluid to the nozzle 32 corresponding to the respective sensor 30. After cleaning the respective sensor 30, the computer 14 is programmed to command the pump 20 to deactivate and stop supplying washer fluid to the supply lines 22, 26. Additionally, the computer 14 is programmed to command the solenoid valve 16 corresponding to the respective sensor 30 to move to the closed position.

The computer 14 is programmed to determine that the cleaning system 28 has a fluid leak based on a difference between a first pressure and a second pressure in the primary supply line 22. The computer 14 determines the first and second pressures based on data received from the pressure sensor 34, e.g., via the communications network 56. That is, the computer 14 determines the first and second pressures between the one-way check valve 54 and the manifold 18. The computer 14 is programmed to determine the first and second pressures based on pressure sensor 34 data. For example, the computer 14 can determine the first pressure based on first data received from the pressure sensor 34 and the second pressure based on second data received from the pressure sensor 34. The computer 14 receives first data from the pressure sensor 34 after commanding the solenoid valve 16 to move to the closed position and after commanding the pump 20 to activate, i.e., to supply washer fluid to the primary supply line 22. The computer 14 can then determine the first pressure based on a look-up table, or the like, specifying a pressure corresponding to the received voltage. The first pressure is specified as a numerical value. The computer 14 receives the second data from the pressure sensor 34 after determining the first pressure and after commanding the pump 20 to deactivate, i.e., to stop supplying washer fluid to the primary supply line 22. The computer 14, similar to that described above with respect to the first pressure, is programmed to determine the second pressure based on the second data. The second pressure is specified as a numerical value.

The computer 14 is programmed to determine a difference between the first pressure and the second pressure. Said differently, the computer 14 is programmed to determine a pressure drop in the primary supply line 22 after commanding the pump 20 to deactivate. The computer 14 determines the difference by subtracting the numerical value of the second pressure from the numerical value of the first pressure.

The computer 14 is programmed to determine the respective solenoid valve 16 is in the closed position based on comparing the difference, e.g., the absolute value of the difference, to a first threshold. The first threshold is a pressure drop below which the computer 14 determines a solenoid valve 16 is in the closed position. The first threshold may be determined empirically to determine a pressure drop in the primary supply line 22 caused by the pump 20 deactivating. The computer 14 may store the first threshold, e.g., in a memory. When the difference is less than or equal to the first threshold, the computer 14 determines that the cleaning system 28 does not have a fluid leak. Additionally, the computer 14 determines that the respective solenoid valve 16 is in the closed position when the difference is less than or equal to the first threshold. When the difference is greater than or equal to the first threshold, the computer 14 determines that the cleaning system 28 has a fluid leak. For example, the computer 14 can determine that the respective solenoid is at least partially open, i.e., not in the closed position, as discussed below.

Upon determining that the cleaning system 28 has a fluid leak, the computer 14 is programmed to determine whether the fluid leak is in the manifold 18 or between the manifold 18 and the pump 20 based on determining a fluid is on a sensor 30. The computer 14 is programmed to determine a fluid is on a sensor 30 based on the data received from the sensor 30 for which the fluid was detected. For example, the computer 14 may determine, e.g., according to known image-analysis techniques, that a set of pixels in image data received from the respective sensor 30 is distorted, e.g., blurred, compared to the other of the pixels in the image data, suggesting that a fluid is on a portion of the sensor 30. Other algorithms may be used, e.g., classical computer vision or machine learning algorithms such as convolutional neural networks. When the computer 14 determines that no fluid is on the sensor 30, the computer 14 determines that the fluid leak is between the pump 20 and the manifold 18, e.g., in the primary supply line 22 and/or connections between the primary supply line 22 and another component.

When the computer 14 determines that a fluid is on the sensor 30, the computer 14 is programmed to identify the fluid as one of washer fluid or environmental fluid. As used herein, "environmental fluid" is fluid that is not stored in the reservoir 44 for cleaning. In other words, environmental fluid is fluid from the environment around the vehicle 12, e.g., rain, water splashed from the road, sleet, snow, mist, etc. For example, the computer 14 can identify the fluid based on a measurement of some aspect of the fluid being above a threshold. Example measurements of the fluid includes distortion value, contact angle, size, transparency, distribution, luminosity gradient, etc.

As another example, the computer 14 can identify the fluid using conventional image-recognition techniques, e.g., a convolutional neural network programmed to accept images as input and output an identified fluid. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of obstruction, and the final output is the type of obstruction with the highest score.

When the computer 14 identifies the fluid as washer fluid, the computer 14 determines that the manifold 18 has the fluid leak. Specifically, the computer 14 determines that the solenoid valve 16 corresponding to the sensor 30 is at least partially open, i.e., not in the closed position. When the computer 14 identifies the fluid is environmental fluid, the computer 14 determines that the fluid leak is between the pump 20 and the manifold 18, e.g., in the primary supply line 22 and/or connections between the primary supply line 22 and another component. Additionally, the computer 14 determines that the solenoid valve 16 corresponding to the sensor 30 is in the closed position.

Upon determining that the manifold 18 has the fluid leak, i.e., the solenoid valve 16 corresponding to the sensor 30 is not in the closed position, the computer 14 is programmed to determine whether the respective solenoid is completely open, i.e., in the open position, based on comparing the difference between the first and second pressures to a second threshold. The second threshold is a pressure drop below which the computer 14 determines a solenoid valve 16 is partially open, i.e., restricting flow through the respective tube 50. The computer 14 may store the second threshold, e.g., in a memory. When the difference is less than the second threshold, the computer 14 determines that the respective solenoid valve 16 is partially open, i.e., between the open position and the closed position. That is, the computer 14 determines that the solenoid valve 16 is permitting restricted flow through the respective tube 50. When the difference is greater than or equal to the second threshold, the computer 14 determines that the respective solenoid valve 16 is completely open, i.e., in the open position. That is, the computer 14 determines the solenoid valve 16 is permitting unrestricted flow through the respective tube 50.

Upon determining that the cleaning system 28 has a fluid leak, the computer 14 is programmed to set a diagnostic trouble code (DTC) or the like in the onboard diagnostics system identifying the fluid leak in the cleaning system 28. The computer 14 may set separate DTC's based on the fluid leak. For example, the computer 14 may set one DTC based on determining that the fluid leak is in the manifold 18, i.e., that a solenoid valve 16 is at least partially open, and another DTC based on determining that the fluid leak is between the pump 20 and the manifold 18. Additionally, or alternatively, the computer 14 may be programmed to output an alert, e.g., an audio and/or visual alert, to the user, e.g., via a display, an indicator light, etc., indicating the cleaning system 28 requires repair and/or maintenance.

Figure 4:
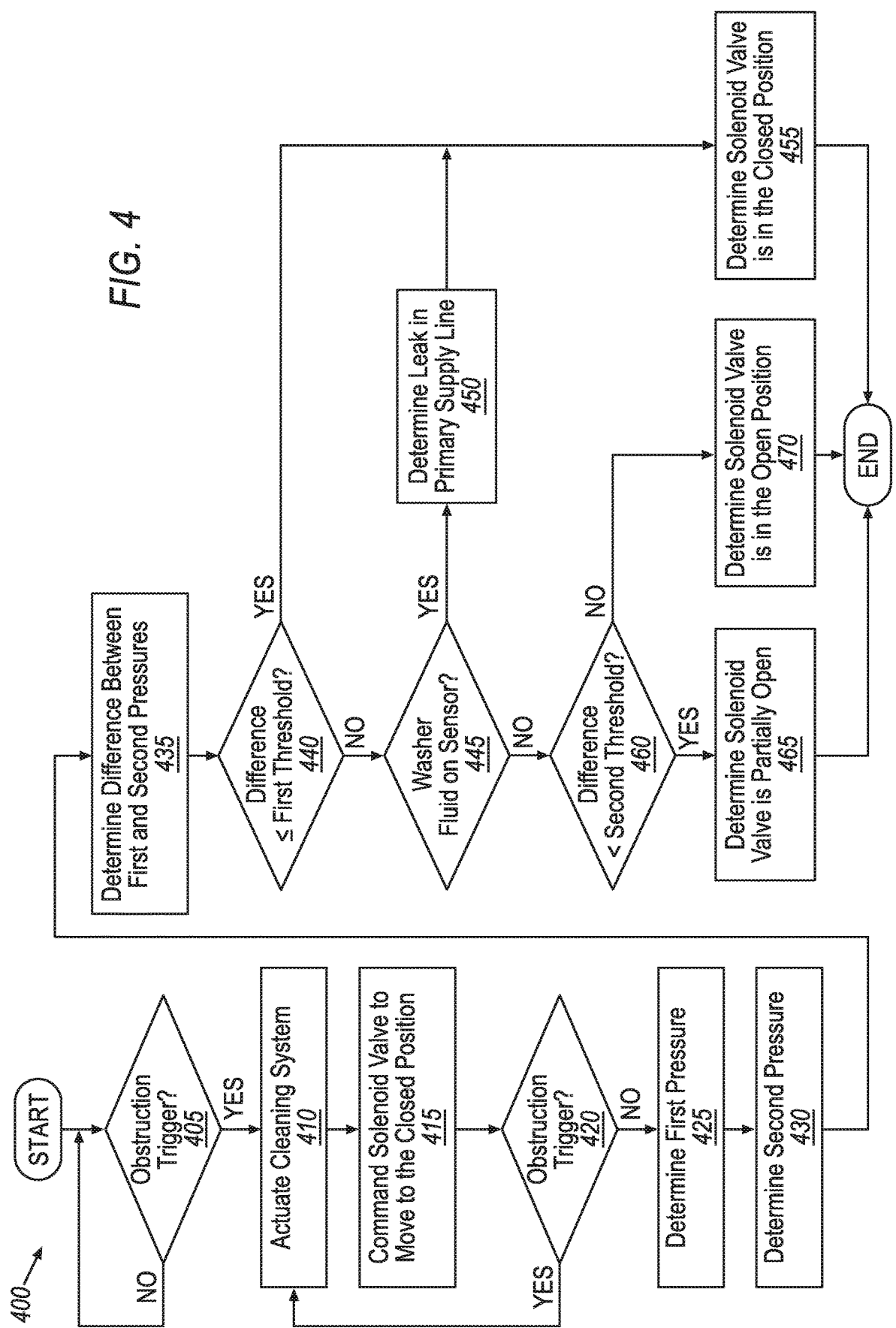
FIG. 4 is a flowchart of an example process for determining a solenoid valve of the cleaning system is in a closed position.

FIG. 4 is a flowchart of an example process 400 for determining a solenoid valve 16 of a manifold 18 is in a closed position. The computer 14 is programmed to perform the process 400. The process begins in a block 405.

In the block 405, a computer 14 determines whether an obstruction trigger has occurred. For example, the computer 14 may determine that debris is on one of a plurality of sensors 30 based on data received from the respective sensor 30, as discussed above. As another example, the computer 14 may receive a user command to perform cleaning of one or more sensors 30. If the computer 14 determines an obstruction trigger has not occurred, then the process 400 remains in the block 405. If the computer 14 determines an obstruction trigger has occurred, then the process 400 proceeds to a block 410.

In the block 410, the computer 14 actuates the cleaning system 28 to spray the respective sensor 30 with washer fluid. That is, the computer 14 commands the pump 20 to activate to supply washer fluid to the supply lines 22, 26. Additionally, the computer 14 commands the solenoid valve 16 corresponding to the respective sensor 30 to move to an open position while the rest of the solenoid valves 16 remain closed, thus routing washer fluid to the nozzle 32 aimed at the respective sensor 30, as discussed above. That is, the solenoid valve 16 in the open position allows washer fluid flow through the manifold 18. The process 400 continues in a block 415.

In the block 415, after cleaning the sensor 30, the computer 14 commands the pump 20 to deactivate, i.e., to stop supplying washer fluid to the supply lines 22, 26, and commands the solenoid valve 16 corresponding to the respective sensor 30 to move to a closed position. In the closed position, the solenoid valve 16 prevents washer fluid flow to the nozzle 32 aimed at the respective sensor 30, as discussed above. That is, the solenoid valve 16 in the closed position prevents washer fluid flow through the manifold 18. The process 400 continues in a block 420.

In the block 420, the computer 14, in a manner similar to that described above with respect to the block 405, determines whether an obstruction trigger has occurred. For example, the computer 14 can determine whether an obstruction trigger has occurred within a predetermined time of deactivating the pump 20 and commanding the solenoid valve 16 to move to the closed position. The predetermined time may be determined experimentally based on an amount of time for the computer 14 to obtain and analyze pressure sensor 34 data. If the computer 14 determines an obstruction trigger has occurred, e.g., within the predetermined time, then the process 400 returns to the block 410. If the computer 14 determines an obstruction trigger has not occurred, e.g., within the predetermined time, then the process 400 proceeds in a block 425.

In the block 425, the computer 14 determines a first pressure in the primary supply line 22. Specifically, the computer 14 commands the pump 20 to activate after commanding the solenoid valve 16 corresponding to the respective sensor 30 to move to the closed position. The computer 14 then determines the first pressure based on first data received from the pressure sensor 34, as discussed above. That is, the computer 14 determines the first pressure between the pump 20 and the manifold 18 after commanding the solenoid valve 16 to move to the closed position and while the pump 20 is supplying washer fluid to the primary supply line 22. The process 400 continues in a block 430.

In the block 430, the computer 14 determines a second pressure in the primary supply line 22. Specifically, the computer 14 commands the pump 20 to deactivate after determining the first pressure. In this situation, the one-way check valve 54 prevents washer fluid from flowing back to the pump 20. The computer 14 then determines the second pressure based on second data received from the pressure sensor 34, as discussed above. That is, the computer 14 determines the second pressure between the pump 20 and the manifold 18 after commanding the pump 20 to stop supplying washer fluid to the primary supply line 22. The process 400 continues in a block 435.

In the block 435, the computer 14 determines a difference between the first pressure and the second pressure. That is, the computer 14 determines a pressure drop in the primary supply line 22 as a result of the pump 20 deactivating. Said differently, the computer 14 determines the difference by subtracting the numerical value of the first pressure from the numerical value of the second pressure. The computer 14 may store the difference, e.g., in a memory. The process 400 continues in a block 440.

In the block 440, the computer 14 determines whether the difference is less than or equal to a first threshold (as discussed above). That is, the computer 14 compares the difference to the first threshold. If the difference is greater than the first threshold, then the process 400 continues in a block 445. If the difference is less than or equal to the first threshold, then the computer 14 determines that the cleaning system 28 does not have a fluid leak, and the process 400 continues in a block 455.

In the block 445, the computer 14 determines whether washer fluid is on the respective sensor 30 based on data received from the respective sensor 30, as discussed above. For example, the computer 14 can determine a presence or absence of fluid on the sensor 30 based on conventional image-recognition techniques, as discussed above. Upon detecting fluid on the respective sensor 30, the computer 14 can identify the fluid as one of washer fluid or environmental fluid based on, e.g., a measurement of some aspect of the fluid being above a threshold, conventional image-recognition techniques, etc., as discussed above. If the computer 14 determines an absence of fluid on the sensor 30 or identifies fluid on the sensor 30 as washer fluid, then the process 400 continues in a block 450. If the computer 14 identifies the fluid as environmental fluid on the sensor 30, the process 400 continues in a block 460.

In the block 450, the computer 14 determines the cleaning system 28 has a fluid leak. Specifically, the computer 14 determines that the fluid leak is between the pump 20 and the manifold 18. The computer 14 may then set a DTC indicating the fluid leak in the cleaning system 28. For example, the DTC may specify that the fluid leak is in the primary supply line 22 and/or a connection between the primary supply line 22 and another component, e.g., the pressure sensor 34, the pump 20, or the inlet 46 of the manifold 18. Additionally, or alternatively, the computer 14 may output an alert, e.g., an audio, visual, and/or haptic alert, to a user of the vehicle 12 indicating that the cleaning system 28 has a fluid leak. The process continues in the block 455.

In the block 455, the computer 14 determines that the solenoid valve 16 is in the closed position. That is, the computer 14 determines that the solenoid valve 16 is not leaking washer fluid. The process 400 ends following the block 455.

In the block 460, the computer 14 determines whether the difference is less than a second threshold (as discussed above). That is, the computer 14 compares the difference to the second threshold. The second threshold is greater than the first threshold, as discussed above. If the difference is less than the second threshold, then the process continues in a block 465. If the difference is greater than or equal to the second threshold, then the process continues in a block 470.

In the block 465, the computer 14 determines that the solenoid valve 16 is partially open. That is, the computer 14 determines that the solenoid valve 16 is between the open position and the closed position. Said differently, the computer 14 determines that the cleaning system 28 has a fluid leak at the manifold 18. The computer 14 may then set a DTC indicating the fluid leak in the cleaning system 28. For example, the DTC may specify that the solenoid valve 16 is between the open and closed positions. Additionally, or alternatively, the computer 14 may output an alert, e.g., an audio, visual, and/or haptic alert, to a user of the vehicle 12 indicating that the cleaning system 28 has a fluid leak. The process 400 ends following the block 465.

In the block 470, the computer 14 determines that the solenoid valve 16 is completely open. Specifically, the computer 14 determines that the solenoid valve 16 is in the open position. Said differently, the computer 14 determines that the cleaning system 28 has a fluid leak at the manifold 18. The computer 14 may then set a DTC indicating the fluid leak in the cleaning system 28. For example, the DTC may specify that the solenoid valve 16 is in the open position. Additionally, or alternatively, the computer 14 may output an alert, e.g., an audio, visual, and/or haptic alert, to a user of the vehicle 12 indicating that the cleaning system 28 has a fluid leak. The process 400 ends following the block 470.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, N.Y., the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The adjectives "first," "second," and "third" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer including a processor and a memory, the memory storing instructions executable by the processor to:
   actuate a solenoid valve in a manifold to provide fluid to a nozzle aimed at a sensor;
   determine a lack of an obstruction trigger;
   in response to determining the lack of the obstruction trigger, command the solenoid valve to move to a closed position and activate a pump to supply fluid to the manifold via a supply line;
   upon activating the pump to supply fluid to the manifold via the supply line, determine a first pressure in the supply line after commanding the solenoid valve to move to the closed position;
   in response to determining the lack of the obstruction trigger, deactivate the pump to stop supplying fluid to the manifold;

upon deactivating the pump to stop supplying fluid to the manifold, determine a second pressure in the supply line after commanding the solenoid valve to move to the closed position; and while the solenoid valve is commanded to be in the closed position, based on a difference between the first pressure and the second pressure, determine that the solenoid valve is one of (a) at least partially open or (b) in the closed position.

2. The system of claim 1, wherein the instructions further include instructions to determine the solenoid valve is in the closed position based on the difference between the first pressure and the second pressure being less than or equal to a first threshold.

3. The system of claim 1, wherein the instructions further include instructions to determine the solenoid valve is partially open based on the difference between the first pressure and the second pressure being between a first threshold and a second threshold, wherein the second threshold is greater than the first threshold.

4. The system of claim 3, wherein the instructions further include (Original) instructions to determine the solenoid valve is completely open based on the difference between the first pressure and the second pressure being greater than the second threshold.

5. The system of claim 1, wherein the instructions further include instructions to, upon determining the difference between the first pressure and the second pressure is greater than a first threshold, identify a fluid on the sensor as one of washer fluid or environmental fluid based on data from the sensor.

6. The system of claim 5, wherein the instructions further include instructions to determine the solenoid is one of (a) at least partially open based additionally on identifying the fluid as washer fluid on the sensor, or (b) in the closed position based additionally on identifying the fluid as environmental fluid on the sensor.

7. The system of claim 6, wherein the instructions further include instructions to, upon determining the solenoid valve is in the closed position, determine a fluid leak is between the pump and the manifold.

8. The system of claim 1, wherein the instructions further include) instructions to, upon determining the obstruction trigger for the sensor, actuate the solenoid valve to provide fluid to the nozzle aimed at the sensor.

9. The system of claim 1, wherein the supply line includes a one-way check valve between the pump and the manifold.

10. The system of claim 1, wherein the first pressure and the second pressure are determined from data from a single pressure sensor at different times.

11. The system of claim 1, wherein the instructions further include instructions to, upon determining that the solenoid valve is at least partially open, set a diagnostic trouble code in an onboard diagnostics system.

12. The system of claim 1, wherein the instructions further include instructions to, upon determining that the solenoid valve is at least partially open, output an alert to a user via at least one of a display or an indicator light.

13. A method comprising:
actuating a solenoid valve in a manifold to provide fluid to a nozzle aimed at a sensor;
determining a lack of an obstruction trigger;
in response to determining the lack of the obstruction trigger, commanding the solenoid valve to move to a closed position and activating a pump to supply fluid to the manifold via a supply line;

upon activating the pump to supply fluid to the manifold via the supply line, determining a first pressure in the supply line after commanding the solenoid valve to move to the closed position;

in response to determining the lack of the obstruction trigger, deactivate the pump to stop supplying fluid to the manifold;

upon deactivating the pump to stop supplying fluid to the manifold, determining a second pressure in the supply line after commanding the solenoid valve to move to the closed position;

while the solenoid valve is commanded to be in the closed position, based on a difference between the first pressure and the second pressure, determining that the solenoid valve is one of (a) at least partially open or (b) in the closed position.

14. The method of claim 13, further comprising determining the solenoid valve is in the closed position based on the difference between the first pressure and the second pressure being less than or equal to a first threshold.

15. The method of claim 13, further comprising determining the solenoid valve is partially open based on the difference between the first pressure and the second pressure being between a first threshold and a second threshold, wherein the second threshold is greater than the first threshold.

16. The method of claim 13, further comprising, upon determining the difference between the first pressure and the second pressure is greater than a first threshold, identifying a fluid on the sensor as one of washer fluid or environmental fluid based on data from the sensor.

17. The method of claim 16, further comprising, determining the solenoid is one of (a) at least partially open based additionally on identifying the fluid as washer fluid on the sensor, or (b) in the closed position based additionally on identifying the fluid as environmental fluid on the sensor.

18. The method of claim 17, further comprising, upon determining the solenoid valve is in the closed position, determining a fluid leak is between the pump and the manifold.

19. The method of claim 13, further comprising, upon determining the obstruction trigger for the sensor, actuating the solenoid valve to provide fluid to the nozzle aimed at the sensor.

20. A cleaning system comprising:
a pump;
a sensor and a nozzle aimed at the sensor;
a manifold including an inlet, an outlet, and a solenoid valve between the outlet and the nozzle;
a supply line between the pump to the inlet of the manifold;
the supply line including a one-way check valve between the pump and the inlet of the manifold, the one-way check valve positioned to prevent fluid flow from the manifold to the pump;
a pressure sensor fluidly connected to the supply line between the manifold and the one-way check valve; and
a computer communicatively coupled to the solenoid valve and the pump, the computer being programmed to:
actuate the solenoid valve to provide fluid to the nozzle;
determine a lack of an obstruction trigger;
in response to determining the lack of the obstruction trigger, command the solenoid valve to move to a closed position and activate the pump to supply fluid to the manifold via the supply line;

upon activating the pump to supply fluid to the manifold via the supply line, determine a first pressure in the supply line after commanding the solenoid valve to move to the closed position;

in response to determining the lack of the obstruction trigger, deactivate the pump to stop supplying fluid to the manifold;

upon deactivating the pump to stop supplying fluid to the manifold, determine a second pressure in the supply line after commanding the solenoid valve to move to the closed position; and while the solenoid valve is commanded to be in the closed position, based on a difference between the first pressure and the second pressure, determine that the solenoid valve is one of (a) at least partially open or (b) in the closed position.

* * * * *